March 11, 1924.
E. R. HEWITT
FISHING FLY
Filed Jan. 28, 1922
1,486,581
Fig. 1.
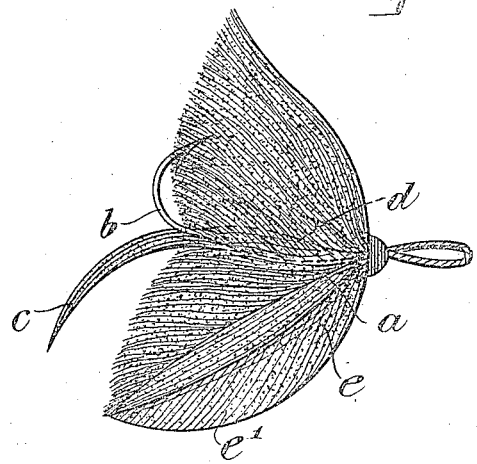
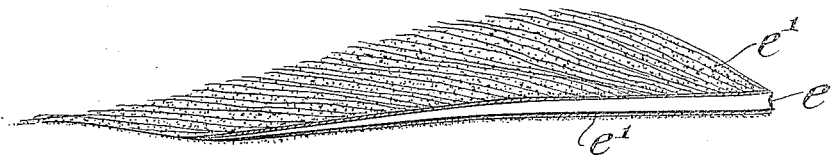
Fig. 2.
INVENTOR
Edward R. Hewitt
BY
Redding & Greeley
ATTORNEYS Patented Mar. 11, 1924.

1,486,581

UNITED STATES PATENT OFFICE.

EDWARD R. HEWITT, OF MIDVALE, NEW JERSEY.

FISHING FLY.

Application filed January 28, 1922. Serial No. 532,511.

*To all whom it may concern:*

Be it known that I, EDWARD R. HEWITT, a citizen of the United States, residing at Midvale, in the State of New Jersey, have invented certain new and useful Improvements in Fishing Flies, of which the following is a specification, reference being had to the accompanying drawing, forming a part hereof.

Artificial fishing flies are employed, of course, for the purpose of simulating insects or small fish which, when moving, might attract a fish. Such flies, ordinarily, are made up of feathers because of their lightness, flexibility, softness and strength. However, it is found that feathers give a light flash of low intensity so that they are not visible at great distances. The object of the present invention is to retain all of the advantages of an artificial fly made up of feathers and yet increase the effectiveness thereof by overcoming the disadvantages of the low light intensity reflected by them. In accordance with the invention it is proposed to treat the feathers, either wholly or in part and either before or after they are tied into a fly, by a suitable metallic coating of very light weight which may be directly applied to the feather by a waterproof adhesive medium. More particularly the invention has for its object to provide a fly whose feathers are covered, either wholly or in part, with a metallic foil, such as aluminum or gold leaf held in place on the feathers by a waterproofing varnish of suitable adhesive properties. A fly thus constructed retains the lightness and the softness and strength given by the feathers and yet offers reflective properties sufficient to cause vivid light flashes in the water visible at relatively great distances. The invention will be described in detail with reference to the embodiment illustrated, somewhat conventionally, in the accompanying drawing, wherein—

Figure 1 is a view in elevation of a fly suitable for bass fishing and embodying the improvements.

Figure 2 is a view in longitudinal section and on an exaggerated scale through a wing covered with aluminum foil.

The drawing does not purport to show anything other than a fanciful representation of a fly suitable for bass fishing, for instance, and the invention is not to be limited to such a type of fly nor to the particular relation of parts since its effectiveness can be realized in connection with wings and feathers used in any type of fly. Further, the fly illustrated has its parts in exaggerated proportions for the sake of clearness.

In accordance with the general practise in fly tying the leader $a$ is laid along the shank of the hook $b$ and the tail $c$ tied with the leader on the shank under the body $d$. In the drawing a wing $e$ is shown as tied on the body. A feather may be employed.

The invention is concerned with the means for increasing the reflected light intensity of the wing in the water so as to be visible at relatively great distances, certainly at greater distances than the natural wing is effective. To this end it is proposed to cover the wing or feather wholly or in part with a light metallic coating, such as aluminum foil or gold leaf, indicated by the stippling $e'$ on the wing surface in the drawing. There is no other suitable way of illustrating this metallic coating by reason of its very thinness and the manner in which it conforms to the wing surface. Its thinness and flexibility are desirable attributes since it is proposed to retain all of the advantages of the wing or feather as recognized in fly-casting, among which may be enumerated lightness in weight, softness, flexibility and strength. The metallic coating may be applied most conveniently and so as to be very durable by first coating the wing or feather surface, or so much of it as is to be covered, with a waterproofing adhesive varnish or the like on which the metallic coating is laid. This adhesive material will form a permanent union between the wing or feather and the metallic coating, will serve the waterproofing function and will not add material weight or stiffness to the fly.

As indicated hereinbefore, the invention is not to be limited to the extent of surface covered, since a metallic coating of this character when applied to either part of the surface will increase the intensity of light reflection. Further, other coatings than of aluminum foil or gold leaf may be employed without departing from the invention.

What I claim is:

1. A fly with feather wings having a light reflecting metallic coating applied thereto.

2. A feather wing for a fly having a light reflecting coating applied thereto.

3. A feather wing for a fly having a metallic coating applied thereto and a waterproof adhesive medium interposed between the feather and the metallic coating.

4. A feather wing for a fly having applied thereto a metallic coating of aluminum foil and a waterproof adhesive varnish applied to the feather and interposed between it and the foil.

This specification signed this 27th day of January, A. D. 1922.

EDWARD R. HEWITT.